United States Patent Office 2,811,387
Patented Oct. 29, 1957

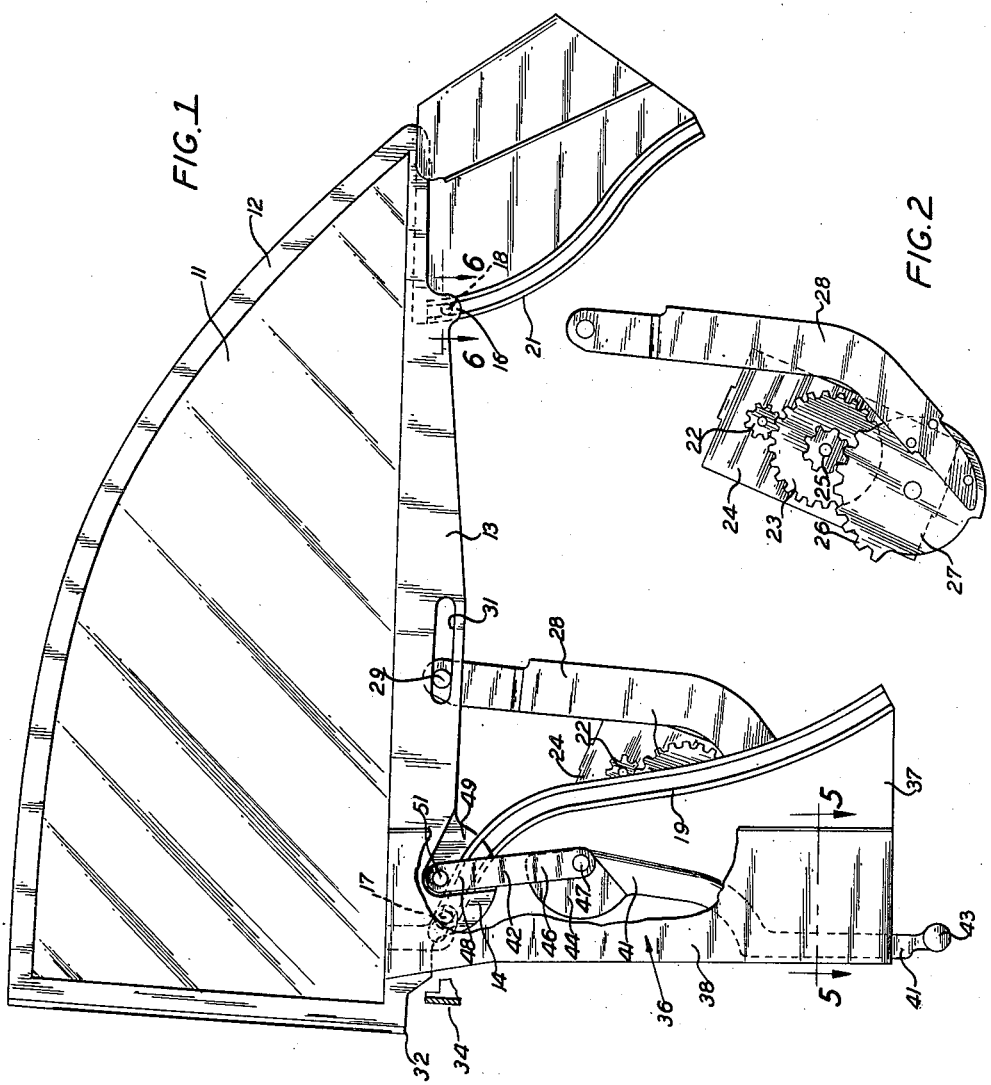

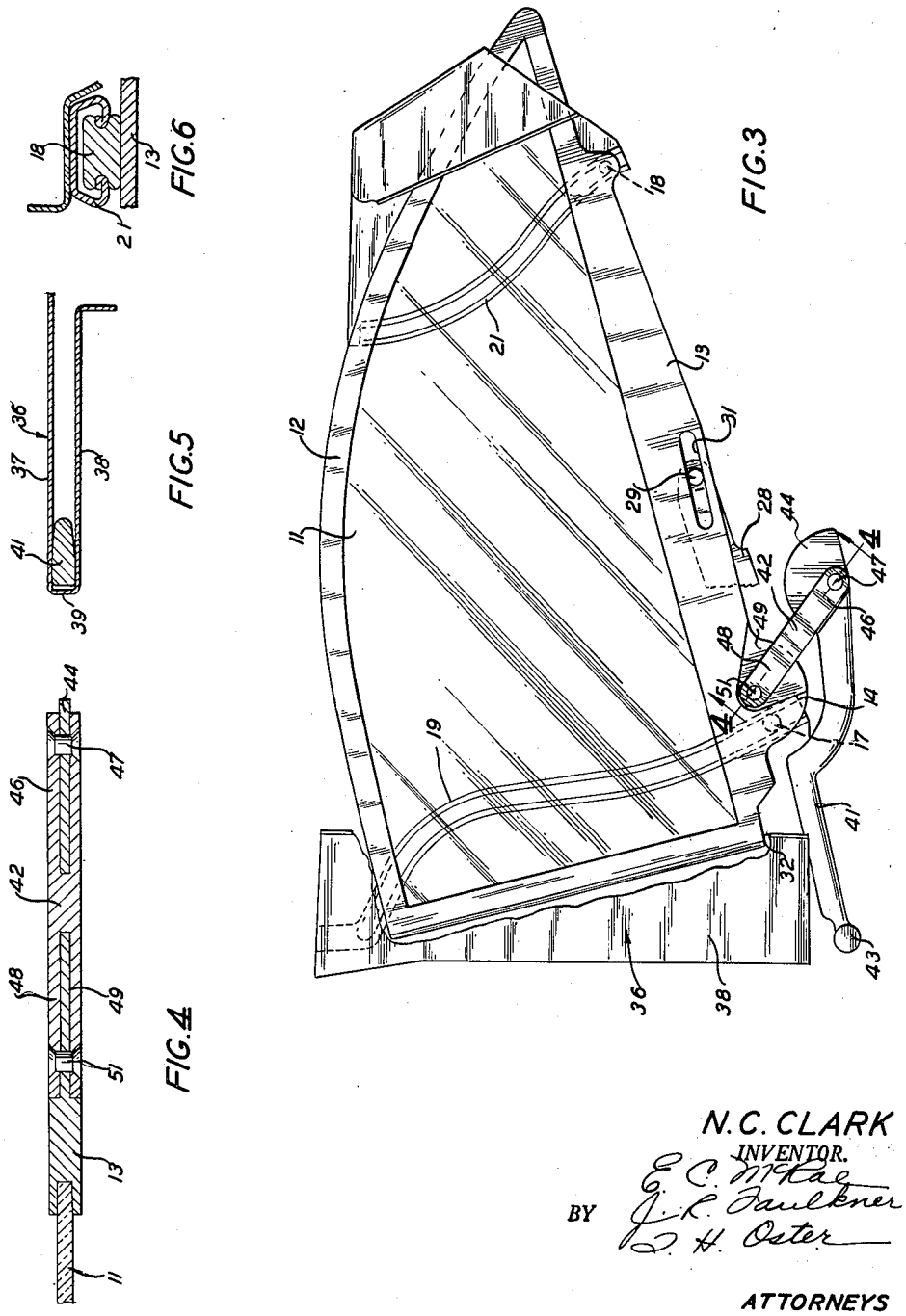

2,811,387

WINDOW CONTROL MECHANISM

Noble C. Clark, Dearborn, Mich., assignor to Ford Motor Company, Dearborn, Mich., a corporation of Delaware Application August 11, 1955, Serial No. 527,781

2 Claims. (Cl. 296—44)

This invention relates generally to motor vehicles, and particularly to means controlling the raising and lowering of a motor vehicle window.

An object of the present invention is to provide mechanism for raising and lowering a motor vehicle window in a predetermined compound path having both vertical and horizontal components. A further object of the invention is to properly support the window during such movement so that it will be supported at all times against lateral shake or displacement, regardless of the position of the window.

In an embodiment of the invention, the lower portion of the window frame supports rollers slidably engaging front and rear curved tracks to guide the window during its raising and lowering movements. The path of movement of the window is controlled so that when lowered it moves first in a generally rearward direction and subsequently in a generally downward direction to move the window into the space available within the vehicle body and to clear certain components such as door pillars. The forward edge of the window frame slides within a channel shaped vertically extending guideway providing support for the window against lateral displacement. A pair of articulated links are also received within the vertical guideway, one of the links being pivoted to the body adjacent the lower portion of the guideway and the other link being pivotally connected to the forward portion of the window frame. Throughout the vertical movement of the window the first link is guided by the vertical guideway, and the connections between the links and between the second link and the window frame are such as to laterally support the window frame against lateral displacement throughout its travel. A regulator arm slidably engages a horizontal slot in the lower portion of the window frame to actuate the raising and lowering of the window.

Other objects and advantages of this invention will be made more apparent as this description proceeds, particularly when considered in connection with the accompanying drawings, wherein:

Figure 1 is a side elevational view of the window mechanism of the present invention, with the window in its fully raised position.

Figure 2 is a side elevational view of window regulator mechanism for the window mechanism of Figure 1.

Figure 3 is a side elevational view similar to Figure 1, but showing the window in its fully lowered position.

Figure 4 is an enlarged cross sectional view taken on the line 4—4 of Figure 3.

Figure 5 is an enlarged cross sectional view taken on the line 5—5 of Figure 1.

Figure 6 is an enlarged cross sectional view taken on the line 6—6 of Figure 1.

Referring now to the drawings, the reference character 11 indicates a motor vehicle window contained within a frame 12. The enlarged bottom rail 13 of the window frame 12 is formed with depending flanges 14 and 16 supporting rollers 17 and 18 respectively. The rollers 17 and 18 are slidably received within front and rear channel shaped tracks 19 and 21 respectively. The tracks 19 and 21 are supported in fixed positions upon the vehicle body to provide predetermined paths of travel for the front and rear portions of the window 11 during its raising and lowering movements.

The raising and lowering of the window 11 is actuated by means of conventional regulator mechanism shown in Figure 2. The regulator includes a pinion 22 adapted to be operated by a regulator handle (not shown) and meshing with an idler gear 23 pivotally mounted upon the regulator plate 24. The idler gear 23 carries a driving pinion 25 meshing with the peripheral teeth 26 of a regulator quadrant 27. Rotation of the regulator quadrant 27 bodily moves a regulator arm 28 suitably secured to the quadrant. At its upper end the regulator arm 28 carries a roller 29 slidably received within a horizontal slot 31 formed in the lower rail 13 of the window frame 12.

Operation of the regulator mechanism is effective to lower the window from the position shown in Figure 1 to the position shown in Figure 2. During this lowering movement the lower forward corner 32 of the window frame 12 follows a path initially moving the window generally rearwardly to clear a pillar 34 and subsequently moving the window generally downwardly.

Referring to Figures 1, 3, and 5, a generally vertically extending sheet metal guideway 36 is provided adjacent the forward portion of the window. This guideway is suitably mounted in fixed position upon the vehicle body, and is generally channel shaped in cross section, having parallel side walls 37 and 38 and a base 39. The side walls 37 and 38 are spaced so as to slidably receive the window frame 12 while providing support therefor. It will be noted that the forward portion of the window frame is thus supported by the vertical guideway 36 throughout its travel. The side wall 37 is extended to support the front guideway 19.

Additional support against lateral shake or displacement of the window is provided by means of a pair of articulated links 41 and 42. One end of the long link 41 is pivotally mounted at 43 upon the vehicle body.

This link is of a uniform thickness throughout the major portion of its length with the thickness corresponding to the spacing between the side walls 37 and 38 of the guideway. The opposite end 44 of the link 41 is thinner in thickness, and is adapted to be straddled by the bifurcated end portion 46 of the link 42, the latter being pivotally connected to the link 41 at 47. It will be noted that the over-all thickness of the bifurcated end portion 46 of the link is the same as the thickness of the body portion of the link 41, so that the link 42 will also be slidably supported within the vertical guideway 36. The opposite end 48 of the short link 42 is also bifurcated to slidably engage the reduced thickness portion 49 of the depending flange 14 of the lower rail 13 of the window frame, being pivotally connected thereto at 51.

From the foregoing it will be seen that the articulated links 41 and 42 and the lower rail 13 of the window frame have a uniform over-all thickness so that they may be slidably received within the vertical guideway 36 and supported thereby against lateral movement. Thus, regardless of the position of the window during its travel, additional stabilizing support will be afforded against lateral displacement thereof.

A channel shaped sheet metal guideway 53 is provided adjacent the rearward portion of the window 11 to slidably receive and support against lateral displacement the rearward portion of the window frame 12.

It will be understood that the invention is not to be limited to the exact construction shown and described, but that various changes and modifications may be made without departing from the spirit and scope of the invention, as defined in the appended claims.

What is claimed is:

1. In a window control mechanism for a motor vehicle window having a frame, window regulator mechanism for raising and lowering said window in a predetermined combined horizontal and vertical path, a vertically extending channel shaped guideway mounted upon said vehicle and slidably receiving the forward portion of said window frame throughout its raising and lowering movements, said window frame intermediate its forward and rearward ends having a portion reduced in thickness, an elongated arm pivotally mounted upon said vehicle adjacent the lower portion of said guideway and extending generally vertically within said guideway in the raised position of said window, said elongated arm being of uniform thickness throughout the major portion of its length with said thickness corresponding to the width of said guideway to be supported thereby, said elongated arm having a portion adjacent its upper end reduced in thickness, and a short link extending vertically between the upper end of said elongated arm and the reduced thickness portion of said window frame in the raised position of said window, said short link having a uniform thickness throughout its length corresponding to the width of said guideway so as to be supported thereby, the opposite ends of said link having bifurcated portions closely embracing the reduced thickness portions of said elongated arm and said window frame, said elongated arm and short link forming an articulated linkage which is laterally rigid and provides lateral stability for said window during its raising and lowering movements.

2. The structure defined by claim 1 which is further characterized in that the reduced thickness portions of said elongated arm and the intermediate portion of said window frame are quadrant shaped in elevation to provide continued lateral stability between said elongated arm and said link and between said link and said window frame throughout the entire vertical movement of said window frame, said elongated arm having at least a portion thereof retained within said vertical guideway throughout the raising and lowering movements of said window to laterally stabilize said elongated arm and consequently said window frame.

References Cited in the file of this patent
UNITED STATES PATENTS

| | | |
|---|---|---|
| 2,110,121 | Ball | Mar. 8, 1938 |
| 2,131,745 | Morrison | Oct. 4, 1938 |
| 2,298,515 | Sullivan | Oct. 13, 1942 |